United States Patent [19]

Kanada et al.

[11] Patent Number: 5,759,216

[45] Date of Patent: Jun. 2, 1998

[54] DIAMOND SINTERED BODY HAVING HIGH STRENGTH AND HIGH WEAR-RESISTANCE AND MANUFACTURING METHOD THEREOF

[75] Inventors: Yasuyuki Kanada; Hirohumi Mizusuna; Tsutomu Nakamura; Tetsuo Nakai, all of Hyogo, Japan

[73] Assignee: Sumitomo Electric Industries, Ltd., Osaka, Japan

[21] Appl. No.: 786,114

[22] Filed: Jan. 17, 1997

Related U.S. Application Data

[62] Division of Ser. No. 563,935, Nov. 29, 1995, abandoned.

[30] Foreign Application Priority Data

Nov. 30, 1994 [JP] Japan .................................. 6-297305

[51] Int. Cl.⁶ .................................................. C09C 1/08
[52] U.S. Cl. .................................................. 51/309; 51/295
[58] Field of Search .......................... 51/293, 295, 309; 125/59; 76/DIG. 12; 264/60

[56] References Cited

U.S. PATENT DOCUMENTS

| | | | |
|---|---|---|---|
| 4,062,660 | 12/1977 | Nicholas et al. | 51/295 |
| 4,518,659 | 5/1985 | Gigl. et al. | 428/539.5 |
| 4,534,773 | 8/1985 | Phaal et al. | 51/293 |
| 4,610,699 | 9/1986 | Yazu et al. | 51/309 |
| 4,636,253 | 1/1987 | Nakai et al. | 75/239 |
| 4,798,026 | 1/1989 | Cerceau | 51/307 |
| 4,899,922 | 2/1990 | Slutz et al. | 51/293 |
| 4,907,377 | 3/1990 | Csillag et al. | 51/309 |
| 4,931,363 | 6/1990 | Slutz et al. | 428/408 |
| 5,096,465 | 3/1992 | Chen et al. | 51/295 |
| 5,190,796 | 3/1993 | Iacovangelo | 427/304 |
| 5,232,469 | 8/1993 | McEachron et al. | 51/295 |
| 5,248,317 | 9/1993 | Tank et al. | 51/293 |
| 5,366,522 | 11/1994 | Nakamura et al. | 51/293 |

FOREIGN PATENT DOCUMENTS

| | | | |
|---|---|---|---|
| 0155066 | 9/1985 | European Pat. Off. | B01J 3/06 |
| 0329954 | 8/1989 | European Pat. Off. | C04B 37/00 |
| 52-12126 | 4/1977 | Japan | B22F 7/02 |
| 54-114513 | 9/1979 | Japan | C04B 35/52 |
| 63-190956 | 8/1988 | Japan | C04B 35/52 |
| 6-6769 | 1/1994 | Japan | C22C 26/00 |
| 6-32655 | 2/1994 | Japan | C04B 35/52 |
| 1257006 | 12/1971 | United Kingdom | C23C 3/00 |
| 1431693 | 4/1976 | United Kingdom | C23F 17/00 |

OTHER PUBLICATIONS

Research Report No. 58, pp. 38 to 48 of National Institute for Research in Inorganic Materials (Japanese) no date.

*Primary Examiner*—Deborah Jones
*Attorney, Agent, or Firm*—W. G. Fasse; W. F. Fasse

[57] ABSTRACT

A method of manufacturing a diamond sintered body includes the following steps: preparing a diamond powder having a particle size within a range of 0.1 to 10 μm, coating the surface of each particle of the diamond powder with a sintering assistant agent including Pd within a range of 0.01 to 40 percent by weight and at least one iron family metal as a remainder, and liquid-phase sintering the coated diamond powder under a high pressure and high temperature condition. In this manner, a diamond sintered body having high strength and high wear-resistance, and containing diamond particles of 80 to 96 percent by volume, can be obtained.

17 Claims, No Drawings

DIAMOND SINTERED BODY HAVING HIGH STRENGTH AND HIGH WEAR-RESISTANCE AND MANUFACTURING METHOD THEREOF

CROSS-REFERENCE TO RELATED APPLICATION

This application is a divisional of prior application U.S. Ser. No. 08/563,935, filed Nov. 29, 1995, and now abandoned.

BACKGROUND OF THE INVENTION

1. Field of the Invention

The present invention relates to a diamond sintered body used as a material for cutting tools, digging tools, drawing dies, wear-resistant parts and the like, and relates to a manufacturing method thereof. More particularly, it relates to a diamond sintered body having improved strength and wear-resistance and to the manufacturing method thereof.

2. Description of the Related Art

A diamond sintered body generally has superior wear-resistance and higher strength as compared with other materials. Therefore, it is used in such fields that require strength and wear-resistance, e.g. the field of cutting tools, digging tools and drawing dies. Such a diamond sintered body can be obtained by filling diamond powder into a container formed of WC-Co cemented carbide, infiltrating Co-W-C eutectic composition liquid-phase from the cemented carbide base material into the diamond powder under high pressure at high temperature, and then sintering the same, as disclosed, for example, in Japanese Patent Publication No. 52-12126. Alternatively, as disclosed in Japanese Patent Laying-Open No. 54-114513, a diamond sintered body can be obtained by premixing diamond powder with a powder containing an iron family solvent metal, and then holding the mixed powder at such a high temperature and high pressure that allows formation of diamond.

The diamond sintered body obtained through the above described methods suffers from problems under difficult sintering conditions. For example, if the diamond particles are too fine or if the solvent metal to be mixed therewith is too small in amount, sintering would be impossible as the solvent metal hardly infiltrates the diamond particles, or the coagulated or agglomerated portions of diamond particles would not be sintered locally, as portions of the diamond particles that are in contact with each other increase. Accordingly, it is not easy to obtain a diamond sintered body having high density, that is, a diamond sintered body having good wear-resistance and a high content of diamond.

In order to solve such problems, a method to obtain a diamond sintered body having high density has been proposed, for example, in Japanese Patent Laying-Open Nos. 63-190756 and 6-32655, and in Research Report No. 58, pp. 38 to 48 of National Institute for Research in Inorganic Materials. In the proposed method, a sintering assistant agent is applied, as a coating, onto the surface of each particle of diamond powder and the coated diamond powder is then sintered.

The diamond sintered body obtained by that method has a high diamond content, and therefore has good wear-resistance. However, when the diamond particle size in the sintered body is large, the strength of the diamond sintered body becomes low, and therefore it does not have sufficient reliability for practical use. Further, when the diamond sintered body having high density is to be obtained by such a method, only a small amount of sintering assistant agent can be added. Therefore, depending on the composition of the sintering assistant agent and on the manner of coating, within the temperature range and pressure range allowing production of diamond, a relatively high temperature and high pressure are required. In such a case, there would be a large strain remaining in the diamond sintered body, which degrades the strength of the diamond sintered body, and hence lowers its reliability in practical use.

In order to prevent degradation of a diamond sintered body at a high temperature, a method has been proposed, for example, in Japanese Patent Laying-Open No. 6-6769. In that proposed method, the surface of diamond particles is coated by a transition metal, B or Si and then the coated diamond powder is sintered in solid-phase. However, in this case it is considered that diamond particles are bonded with the coating material, which is carbonized by solid-phase reaction, interposed therebetween. Therefore, a diamond sintered body obtained by liquid-phase sintering employing an iron family metal as a solvent, and thus allowing direct bonding of diamond particles with each other is superior in view of mechanical strength.

SUMMARY OF THE INVENTION

In view of the above described problems of the prior art, an object of the present invention is to provide a diamond sintered body having high strength and high wear resistance and to provide a manufacturing method thereof.

The diamond sintered body having high strength and high wear-resistance in accordance with one aspect of the present invention includes sintered diamond particles in a proportionate amount of 80 to 96 percent by volume, with a remainder made up of a sintering assistant agent and unavoidable impurities. The sintered diamond particles have a particle size substantially in the range of 0.1 to 10 µm and are directly bonded to each other. The sintering assistant agent includes Pd within the range of 0.01 to 40 percent by weight, with a remainder thereof including at least one element or component selected from Fe, Co and Ni.

In the diamond sintered body in accordance with the first aspect of the present invention, fine diamond particles are sintered with a high density in the presence of a sintering assistant agent including an iron family element. Thus, high strength and high wear-resistance can be realized.

According to a second aspect of the invention, the method of manufacturing a diamond sintered body having high strength and high wear-resistance includes the following steps: preparing a diamond powder having a particle size substantially within a range of 0.1 to 10 µm, precipitating Pd within the range of 0.01 to 40 percent by weight onto the surface of each particle of the diamond powder, electroless plating a sintering assistant agent including at least one component selected from Fe, Co and Ni within the range of 4 to 20 percent by volume onto the surface of each particle of the diamond powder and thus preparing a coated diamond powder, molding a powder compact body of the coated diamond powder, and liquid-phase sintering the powder compact body under a high temperature and high pressure condition in which diamond is stable.

In the method of manufacturing a diamond sintered body in accordance with the second aspect of the present invention, a sintering assistant agent including an iron family element is applied as a coating, within the range of 4 to 20 percent by volume, onto the surface of each particle of the fine diamond powder, and the coated diamond powder is then sintered in liquid-phase under a high pressure and high temperature condition in which diamond is stable, so that a diamond sintered body having high strength and high wear-resistance as well as high diamond content can be obtained.

According to a third aspect of the present invention, the method of manufacturing a diamond sintered body having high strength and high wear-resistance includes the following steps: preparing a diamond powder having a particle size substantially within the range of 0.1 to 10 µm, precipitating Pd within the range of 0.01 to 40 percent by weight onto the surface of each particle of the diamond powder and then electroless plating a sintering assistant agent including at least one component selected from Fe, Co and Ni within the range of 0.1 to 19.9 percent by volume onto the surface of each particle of the diamond powder to prepare a coated diamond powder, molding the powder compact body of the coated diamond powder, bringing an additional sintering assistant agent including at least one of Pd, Fe, Co and Ni into contact with the powder compact body, and sintering the powder compact body in liquid-phase at a high pressure and high temperature condition in which diamond is stable, while infiltrating the additional sintering assistant agent into the powder compact body.

In the method of manufacturing the diamond sintered body in accordance with the third aspect of the present invention, the sintering assistant agent including an iron family element is applied for coating the surface of each particle of fine diamond powder within the range of 0.1 to 19.9 percent by volume, an additional sintering assistant agent is brought into contact with the coated diamond powder, and the coated diamond powder is sintered in liquid-phase under a high pressure and a high temperature in which diamond is stable while infiltrating the additional sintering assistant agent into the sintering diamond powder. Therefore, a diamond sintered body having high diamond content and having high strength and high wear-resistance can be obtained.

DETAILED DESCRIPTION OF THE INVENTION

First, the inventors studied the respective strength of various diamond sintered bodies. As a result, it was found that the strength of the diamond sintered body depends on the size of a defect in the sintered body which serves as an initiation point of breakage or fracture. Here, the term defect means a larger diamond particle in the diamond sintered body, a pool of the sintering assistant agent such as the solvent metal, or a void. The smaller the defect, the higher the strength of the diamond sintered body.

In order to improve the strength of the diamond sintered body, it was found that the larger diamond particles must be reduced, and that the maximum acceptable particle size of diamond is at most 10 µm. In order to provide a coating of sintering assistant agent on the surface of diamond particles, which will be described later, the diamond particles must have a particle size of at least 0.1 µm. In other words, the raw material diamond powder is required to have a particle size within the range of 0.1 to 10 µm.

It was found that, in order to reduce the portion of voids and pools of sintering assistant agent in the sintered body, it is preferable to sinter the coated diamond powder having the sintering assistant agent coating the surface of each particle of diamond powder in liquid-phase. It was found that, preferably, the sintering assistant agent includes Pd and at least one component selected from Fe, Co and Ni which are iron family metals. It was found that by preparing the coated diamond powder to include such a sintering assistant agent within the range of 4 to 20 percent by volume and by sintering the coated diamond powder under a high pressure and high temperature condition in which diamond is stable, a uniform liquid-phase of the sintering assistant agent is generated entirely over or throughout the diamond powder, so that a diamond sintered body having a smaller content of voids and pools of sintering assistant agent is obtained.

Further, it was found that by preparing the coated diamond powder to include the sintering assistant agent including Pd and at least one of Fe, Co and Ni within the range of 0.1 to 19.9 percent by volume, and bringing an additional sintering assistant agent including at least one of Pd, Fe, Co and Ni into contact with the coated diamond powder, uniform infiltration of the additional sintering assistant agent occurs entirely over or throughout the coated diamond powder compact body, supplementing the first sintering assistant agent that is coated onto the diamond powder under a high pressure at a high temperature in which diamond is stable, and hence a diamond sintered body having smaller voids and pools of sintering assistant agent can be obtained.

More specifically, by using a coated diamond powder onto which the above described sintering assistant agent has been coated, uniform melting or infiltration of the sintering assistant agent occurs, so that sintering becomes possible under such a condition that is otherwise not suitable for sintering, and hence a diamond sintered body having high diamond content, high strength and high wear resistance can be obtained.

Here, any of Pd, Fe, Co and Ni may be used by itself as the sintering assistant agent for the diamond powder. However, it was found that when the sintering assistant agent includes Pd in addition to at least one of Fe, Co and Ni, the melting point of the sintering assistant agent is reduced and the sintering property of the diamond powder is remarkably improved. Here, if the content of Pd in the sintering assistant agent is smaller than 0.01 percent by weight, a sufficient effect of lowering the melting point of the sintering assistant agent cannot be obtained. By contrast, if the content of Pd exceeds 40 percent by weight, then the melting point of the sintering assistant agent tends to increase, thus degrading the sintering property of the diamond powder. In other words, the content of Pd in the sintering assistant agent is preferably within the range from 0.01 to 40 percent by weight.

Further, preferably at least 4 percent by weight of the sintering assistant agent should be included when the coated diamond powder coated with the sintering assistant agent is to be sintered, in order to prevent a shortage of the sintering assistant agent, which would make sintering of the diamond powder substantially impossible. On the other hand, the content of the sintering assistant agent should preferably be 20 percent by volume at most, since the wear-resistance of the sintered body is remarkably degraded as the diamond content is reduced if the sintering assistant agent in the diamond sintered body exceeds 20 percent by volume.

Similarly, when sintering of the coated diamond powder is to be performed with an additional sintering assistant agent brought into contact with the powder compact body of the coated diamond powder, the amount of sintering assistant agent coating the diamond particles should preferably be at least 0.1 percent by volume. The reason for this is that if the amount of the coating formed of the sintering assistant agent is smaller than 0.1 percent by volume, then uniform coating by the sintering assistant agent on the surface of the diamond particles becomes difficult, making uniform infiltration of the additional sintering assistant agent impossible. On the other hand, the amount of the coating formed of the sintering assistant agent should preferably be at most 19.9 percent by volume. The reason for this is that, after sintering while infiltrating an additional sintering assistant agent, if the total sintering assistant agent in the sintered body exceeds 20 percent by volume, the diamond content is reduced, and hence wear-resistance of the sintered body is significantly degraded.

As a method of providing a coating of the sintering assistant agent on each particle of the diamond powder, a CVD method, a PVD method or a solution precipitation method may be employed. However, an electroless plating method is most preferably used, from an economical view and from the consideration that uniformity of the sintering assistant agent coating the surface of the diamond particles plays a very important part in improving the sintering property of the powder and in the strength of the sintered body.

When the sintering assistant agent is to be precipitated onto the surface of the diamond particles by electroless plating, mixing or inclusion of impurities in the sintering assistant agent should be prevented as much as possible, in order to obtain a high diamond content after sintering. Considering the fact that catalytic nuclei having high catalytic action must exist on the surface of the diamond particles in the initial reaction of electroless plating, it is preferable that Pd, exhibiting not only the function of a sintering assistant agent but also the catalytic action, be coated first on the surface of the diamond particles. It was found that by providing a coating of a sintering assistant agent including at least one of Fe, Co and Ni with Pd serving as a catalytic nuclei, a coated diamond particle coated with a sintering assistant agent with a smaller amount or degree of impurity can be obtained.

Here, it is desired that the amount of precipitation of Pd on the surface of the diamond particle is at least $10^{-4}$ percent by weight. The reason for this is that if the catalytic action is insufficient, then the electroless plating reaction becomes insufficient, making it difficult to provide a coating of the sintering assistant agent. On the other hand, the amount of precipitation of Pd should desirably be 40 percent by weight at most. The reason for this is to prevent degradation of the sintering property, which is caused by the elevated melting point of the sintering assistant agent caused by excessive Pd.

Further, it was found that if the sintering assistant agent includes at least one of Sn, P and B in addition to the iron family metal, then the Sn, P or B serves to lower the melting point of the sintering assistant agent, significantly improving the sintering property of the diamond powder coated by the sintering assistant agent.

As for precipitation of P in addition to the iron family element, a sintering assistant agent having a desired P concentration can be precipitated by using a hypophosphite, for example sodium hypophosphite, as a reducing agent in the electroless plating solution, and by adjusting the concentration of the reducing agent in the plating solution, the pH of the plating solution and the temperature during plating. Similarly, for precipitation of B in addition to the iron family element, a sintering assistant agent having a desired B concentration can be precipitated by using a boron hydride compound, such as sodium borohydride, as the reducing agent in the electroless plating solution, and by adjusting the concentration of the reducing agent in the plating solution, the pH of the plating solution and the temperature during plating. Meanwhile, Sn has a superior absorption property with respect to the surface of the diamond powder particle. Therefore, it can be directly absorbed onto the diamond particle surface from a tin chloride solution, for example. Further, precipitation of Pd serving as the catalytic nucleus after absorption of Sn onto the diamond particle surface as pre-processing for electroless plating (sensitizing activating method), or precipitation of Sn and Pd simultaneously (catalyst accelerating method) is preferable, since it promotes absorption of Pd at the surface of the diamond particles.

At this time, if the total content of Sn, P and B in the sintering assistant agent is smaller than 0.01 percent by weight, then the effect of lowering the melting point of the sintering assistant agent cannot be obtained. By contrast, if it exceeds 30 percent by weight, then melting of diamond to the iron family metal which serves as a solvent metal in the sintering assistant agent at the time of sintering is hindered, so that the binding strength between diamond particles becomes lower, thus degrading the strength of the sintered body, and degrading the thermal properties of the sintered body. The total content of Sn, P and B should more preferably be within the range of 0.01 to 11.5 percent by weight.

When the diamond particles are to be coated with the sintering assistant agent by electroless plating, the iron family element precipitated by electroless plating is, in most cases, precipitated as an oxide. If sintering is performed using a sintering assistant agent including an oxide, oxygen derived from the oxide may possibly generate voids in the sintered body, and it may hinder the melting and precipitation reaction of diamond in the sintering assistant agent serving as the solvent. Therefore, it may degrade the property of the diamond sintered body. In order to prevent such an undesirable effect caused by oxygen, the coated diamond powder after electroless plating should preferably be reduced by heat treatment in a vacuum or in a hydrogen atmosphere.

It was found that when electroless plating is performed on the diamond powder, the diamond powder can be coated uniformly by the sintering assistant agent if the plating solution including the diamond powder is fluctuated or agitated by at least one of stirring and ultrasonic vibration.

Further, in order to obtain a diamond sintered body having higher density, it is preferable to perform a heat treatment at a high temperature on the diamond powder under such conditions that make diamond unstable so that the diamond particles are partially turned to graphite at and progressing from the surface thereof, to coat the partially graphitized diamond particles with the sintering assistant agent and to perform sintering thereafter, or to coat the diamond powder with the sintering assistant agent, to turn the coated diamond particles into graphite partially from the surface thereof and then perform sintering. The reason for this is as follows. Diamond powder is not susceptible to plastic deformation. Therefore, even under high pressure, spaces tend to remain between diamond particles. However, if the surface of the diamond particles is turned into graphite, then the graphite portion is more susceptible to plastic deformation, and hence the density of the sintered body can be substantially improved. Further, considering melting of carbon and re-precipitation thereof in the sintering assistant agent during sintering, the speed of reaction of graphite is faster than that of diamond, and hence the sintering property is improved if the diamond surface is turned into graphite.

From these reasons, it would be understood that a diamond sintered body having a higher density could be obtained if the diamond surface is partially turned to graphite. At this time, if the ratio of graphitization of the diamond particles is smaller than 0.5 percent by volume, then the density of the sintered body is hardly improved. Meanwhile, if the ratio of graphitization of the diamond particles exceeds 80 percent by volume, then the conversion of graphite to diamond during sintering under such high pressure and high temperature at which diamond is stable becomes imperfect, resulting in graphite remaining in the diamond sintered body. Therefore, the preferable range of partial graphitization of the diamond particles is 0.5 to 80 percent by volume.

Now, if the above described diamond sintered body is to be obtained, it is possible that various materials are mixed into the sintered body in small quantities. For example, the coated diamond powder is generally filled into a container formed of a cemented carbide or a refractory metal and then sintered. Therefore, W, Ta, Mo, and/or Cr, which are the components of the container, or carbides thereof may possibly be mixed into the sintered body. However, even if such material is mixed into the sintered body, such material does not cause any problem provided that the diamond content in the sintered body is within the range of 80 to 96 percent by volume.

Similarly, even when the additional sintering assistant agent is brought into contact with the powder compact body as a supplement to the sintering assistant agent in the coated diamond powder, and infiltrated into the powder compact body during sintering, it does not cause any problem provided that the diamond content of the sintered body is within the range of 80 to 96 percent by volume. The additional sintering assistant agent arranged in contact with such powder compact body may have similar compositions as those for the sintering assistant agent used for coating of the diamond particle.

DESCRIPTION OF THE PREFERRED EMBODIMENTS (Embodiment 1)

TABLE 1

| Powder sample | Diamond particle size (μm) | Method of applying sintering assistant agent | Content of sintering assistant agent (vol. %) | Composition of sintering assistant agent (wt. %) |
|---|---|---|---|---|
| 1A | 0.1–4 | electroless plating | 6.0 | 92.9-Co, 0.05-Pd, 3.95-Fe, 3-P, 0.1-Sn |
| 1B | 0.1–4 | electroless plating | 13.0 | 92.9-Co, 0.05-Pd, 3.95-Fe, 3-P, 0.1-Sn |
| 1C | 0.1–4 | electroless plating | 26.0 | 92.9-Co, 0.05-Pd, 3.95-Fe, 3-P, 0.1-Sn |
| 1D | 0.1–4 | PVD | 6.0 | 92.9-Co, 0.05-Pd, 3.95-Fe, 3-P, 0.1-Sn |
| 1E | 0.1–4 | PVD | 13.0 | 92.9-Co, 0.05-Pd, 3.95-Fe, 3-P, 0.1-Sn |
| 1F | 0.1–4 | PVD | 26.0 | 92.9-Co, 0.05-Pd, 3.95-Fe, 3-P, 0.1-Sn |
| 1G | 0.1–4 | mixing ultra fine powder | 6.0 | 100-Co |
| 1H | 0.1–4 | mixing ultra fine powder | 13.0 | 100-Co |
| 1I | 0.1–4 | mixing ultra fine powder | 26.0 | 100-Co |
| 1J | 0.1–4 | cemented carbide ball mill | 6.0 | 25-Co, 75-WC |
| 1K | 0.1–4 | cemented carbide ball mill | 13.0 | 25-Co, 75-WC |
| 1L | 0.1–4 | cemented carbide ball mill | 26.0 | 25-Co, 75-WC |

TABLE 1-continued

Table 1 shows various powder samples prepared for studying the influence mainly of the method of applying the sintering assistant agent, and its content and composition, on mechanical properties of the diamond sintered body. More specifically, powder samples 1A to 1L shown in Table 1 are all raw material diamond powders having a particle size within the range of 0.1 to 4 μm, while the method of applying the sintering assistant agent, and the content and composition thereof are changed variously.

For the samples 1A, 1B and 1C, the following process was performed to coat the diamond powder particles with the sintering assistant agent by electroless plating. First, diamond powder was degreased in alcohol. The degreased diamond powder was cleaned in flowing water, cleaned in hydrochloric acid solution of 5 percent by weight, and then again cleaned in flowing water. The diamond powder thus cleaned was immersed for one minute in a solution including stannous chloride and hydrochloric acid at room temperature as pre-processing, so as to cause absorption of Sn at the surface of the diamond particles (sensitizing). The sensitized diamond powder was washed with water and thereafter immersed for one minute in a hydrochloric acid solution containing palladium chloride at room temperature, and thus Pd was precipitated at the surface of the diamond particles (activated).

The activated diamond powder was washed with water, and thereafter immersed for a prescribed time period in a Co-Fe-P electroless plating solution held at 75° C., containing cobalt sulfate, iron sulfate and sodium hypophosphite. The longer the time of immersion in the electroless plating solution, the larger the amount of sintering assistant agent coating the surface of the diamond particles, and the larger the content of the sintering assistant agent in the powder samples. In the step of electroless plating, the preplating solution and plating solution were stirred and at the same time, subjected to ultrasonic vibration. The coated diamond powder which was subjected to electroless plating in this manner was cleaned, the surface of the diamond particles was partially graphitized by heat treatment in a vacuum at 1000° C. for 60 minutes, and then the powder was collected, whereby the coated powder samples 1A to 1C having such contents and compositions of the sintering assistant agent as shown in Table 1 were obtained.

For the samples 1D to 1F, the sintering assistant agent has the same composition as those for the samples 1A to 1C. However, coating of the sintering assistant agent was performed using an arc ion plating method. More specifically, the sintering assistant agent was applied to the surface of the diamond powder particles by an arc ion plating method in which a target corresponding to the composition of the sintering assistant agent and a bias voltage of 350 V were used in an argon atmosphere of $1 \times 10^{-2}$ torr.

For samples 1G to 1I, ultra fine Co powder having a particle size of 500 Å was used as the sintering assistant agent. Diamond powder and ultra fine Co powder corresponding to the prescribed content were put in a ball mill container formed of Teflon with mixing balls formed of Teflon therein. The powders were mixed for 4 hours, whereby the mixed powder samples 1G to 1I were obtained.

In preparing the samples 1J to 1L, diamond powder was put in a ball mill having mixing balls and a container formed of cemented carbide WC-Co, and the ball mill was operated for a prescribed time period. During the operation of the cemented carbide ball mill, the cemented carbide powder that was scraped off from the mixing balls and the container was mixed as a sintering assistant agent into the diamond powder. The content of the cemented carbide powder mixed into the diamond powder can be adjusted by changing the length of time of operating the cemented carbide ball mill.

The powder samples 1A to 1L shown in Table 1 were each sealed in a container formed of tantalum, kept at a pressure of 50 kb at a temperature of 1400° C. for 10 minutes by using a belt type high pressure apparatus, and thus sintered. Table 2 shows the diamond content and wear-resistance of the diamond sintered body samples obtained in this manner.

TABLE 2

| Sintered body sample | Diamond content (vol. %) | Flank Wear (μm) |
|---|---|---|
| 2A | 93.8 | 31 |
| 2B | 86.9 | 65 |
| 2C | 74.2 | 131 |
| 2D | 92.3 | damaged |
| 2E | 86.8 | damaged |
| 2F | 73.9 | damaged |
| 2G | sintering not possible | |
| 2H | 86.7 | damaged |
| 2I | 74.0 | damaged |
| 2J | sintering not possible | |
| 2K | sintering not possible | |
| 2L | 73.9 | 142 |

Sintered body samples 2A to 2L of Table 2 were obtained by sintering powder samples 1A to 1L shown in Table 1. As can be seen from Table 2, in samples 2G, 2J and 2K, the amount of sintering assistant agent was small and distribution thereof was not uniform. Since uniform melting of the sintering assistant agent did not occur entirely in the diamond powder, sintering was insufficient, and hence a complete sintered body could not be obtained.

Meanwhile, the samples providing complete sintered bodies were processed to make cutting tools thereof, and the performance of the tools was evaluated under the following cutting conditions.

Work piece: a round bar of Al-16 wt % Si having six grooves on the surface along the axial direction.

Peripheral surface velocity of the work piece: 500 (m/min)

Bit cutting depth: 0.6 (mm)

Bit feeding speed: 0.12 (mm/rev)

Cutting time: 3 (min)

The flank wear of the tools as a result of the cutting test was as shown in Table 2. As can be seen from Table 2, sintering is possible in sintered body samples 2A and 2B in accordance with the present invention even when the amount of sintering assistant agent is small. Therefore, tools having a high diamond content and a superior wear-resistance can be obtained. Further, since the sintered body samples 2A and 2B have a uniform sintered body texture, they have high strength, and it becomes apparent that they have good damage resistance as cutting tools.

By contrast, it is apparent that sintered body samples 2C and 2L having a low diamond content are inferior in wear-resistance. Of the sintered body textures of samples 2D, 2E, 2F, 2H and 2I, an uneven distribution of the sintering assistant agent generated in the PVD method or Co pools derived from aggregation of ultra fine Co powder particles were observed, which pools lowered the strength and hence caused damage to the sintered body during cutting. Thus the sintered bodies could not be used as cutting tools.

TABLE 3

| Powder sample | Diamond particle size (μm) | Method of applying sintering assistant agent | Agitation of plating solution | Content of sintering assistant agent (vol. %) | Composition of sintering assistant agent (wt. %) |
|---|---|---|---|---|---|
| 3A | 1–2 | electroless plating | stirring + ultrasonic vibration | 9 | 97-Ni, 0.5-Pd, 2-P, 0.5-Sn |
| 3B | 1–2 | electroless plating | stirring + ultrasonic vibration | 9 | 89-Ni, 0.5-Pd, 10-P, 0.5-Sn |
| 3C | 1–2 | electroless plating | stirring + ultrasonic vibration | 9 | 64-Ni, 0.5-Pd, 35-P, 0.5-Sn |
| 3D | 1–2 | electroless plating | not agitated | 9 | 97-Ni, 0.5-Pd, 2-P, 0.5-Sn |
| 3E | 1–2 | electroless plating | not agitated | 9 | 89-Ni, 0.5-Pd, 10-P, 0.5 Sn |
| 3F | 1–2 | electroless plating | not agitated | 9 | 64-Ni, 0.5-Pd, 35-P, 0.5-Sn |
| 3G | 1–2 | mixing ultra fine powder | — | 9 | 100-Ni |

Table 3 shows various powder samples prepared for studying the influence of the method of applying the sintering assistant agent, and the composition and conditions of electroless plating on the mechanical properties of the sintered bodies.

For samples 3A to 3C, the surface of the diamond particles was partially graphitized by heat treatment in vacuum at 1450° C. for 30 minutes, then the diamond powders were degreased and subjected to acid cleaning in a similar manner as described in connection with Table 1 and thereafter the diamond powders were subjected to surface activation, in order to coat the diamond powder particles with the sintering assistant agent by electroless plating. Thereafter, the diamond powders were immersed in an Ni-P electroless plating solution containing nickel sulfate and sodium hypophosphite and held at 60° C. During the step of electroless plating, the preplating solution and the plating solution were agitated by stirring and ultrasonic vibration. The composition of the sintering assistant agent was adjusted by changing the pH of the plating solution.

Samples 3D to 3F were prepared by electroless plating similar to samples 3A to 3C. However, agitation by stirring and ultrasonic vibration was not applied to the electroless plating solution.

As for sample 3G, diamond powder was put in a ball mill container formed of Teflon containing mixing balls formed of Teflon, together with ultra fine Ni powder having a powder size of 200 Å, and mixed for 4 hours.

The powder samples of Table 3 were each sealed in a container of Mo and sintered for 15 minutes at a pressure of 45 kb at a temperature of 1350° C. by using a belt type high pressure apparatus. Various properties of the sintered body samples obtained in this manner are shown in Table 4.

TABLE 4

| Sintered body sample | Diamond content (vol. %) | Composition of sintering assistant agent after sintering (wt. %) | Three point bending strength (kgf/mm$^2$) |
|---|---|---|---|
| 4A | 90.9 | 97-Ni, 0.5-Pd, 2-P, 0.5-Sn | 263 |
| 4B | 90.8 | 89-Ni, 0.5-Pd, 10-P, 0.5-Sn | 254 |
| 4C | 90.9 | 64-Ni, 0.5-Pd, 35-P, 0.5-Sn | 193 |
| 4D | 90.7 | 97-Ni, 0.5-Pd, 2-P, 0.5-Sn | 179 |
| 4E | 90.8 | 89-Ni, 0.5-Pd, 10-P, 0.5-Sn | 164 |
| 4F | 90.0 | 64-Ni, 0.5-Pd, 35-P, 0.5-Sn | 142 |
| 4G | sintering not possible | | |

The sintered body samples 4A to 4G shown in Table 4 were obtained from powder samples 3A to 3G of Table 3. However, similar to the sample 2B of Table 2, locally unsintered regions were generated in sample 4G, and complete sintered body could not be obtained.

The samples from which complete sintered bodies were obtained were each processed to a bar-shaped sample piece having dimensions of 6×3×0.3 mm, and thereafter the strength thereof was evaluated by a three point bending test with a bending span of 4 mm. As a result, as can be seen from Table 4, it is apparent that samples 4A to 4C have improved strengths compared with samples 4D to 4F. More specifically, as the plating solution was stirred and subjected to ultrasonic vibration during electroless plating of the diamond powder, a uniform coating of sintering assistant agent was formed on the diamond particles, defects in the diamond sintered body were reduced and hence the strength of the sintered body was significantly improved. Further, in view of the fact that samples 4A and 4B have higher strength than samples 4C and 4F, it was found that when the sintering assistant agent includes P and Sn, the total content thereof should desirably be in the range of 0.01 to 30 percent by weight. Further, it was found that when the sintering assistant agent includes B, the desired content thereof is from 0.01 to 30 percent by weight.

(Embodiment 3)

TABLE 5

| Powder sample | Diamond particle size (μm) | Amount of coating of sintering assistant agent (vol. %) | Composition of coating sintering assistant agent (wt. %) | Composition of additional sintering assistant agent (wt. %) |
|---|---|---|---|---|
| 5A | 2–3 | 0.1 | 92.0-Ni, 7.0-Pd, 1.0-Sn | 100-Ni |
| 5B | 2–3 | 0.1 | 92.0-Ni, 7.0-Pd, 1.0-Sn | 98-Ni, 2-B |
| 5C | 2–3 | 0.1 | 92.0-Ni, 7.0-Pd, 1.0-Sn | 89-Ni, 11-B |
| 5D | 2–3 | 0.1 | 92.0-Ni, 7.0-Pd, 1.0-Sn | 79-Ni, 21-B |
| 5E | 2–3 | 0.1 | 92.0-Ni, 7.0-Pd, 1.0-Sn | 66-Ni, 34-B |

Table 5 shows various powder samples prepared for studying the influence of the composition of the additional sintering assistant agent on the strength of the sintered bodies, when the additional sintering assistant agent which is brought into contact with the coated diamond powder compact body is infiltrated into the powder compact body during sintering.

For samples 5A to 5E, diamond powder was degreased and subjected to acid cleaning in a similar manner as for Table 1, to coat the diamond powder particles with the sintering assistant agent by electroless plating. Thereafter, catalyzing was performed as pre-processing of electroless plating, by immersing the diamond powder in a solution containing palladium chloride, stannous chloride and hydrochloric acid for two minutes at room temperature. Thereafter, accelerating of the diamond powder was performed by immersing the powder in a sulfuric acid solution for two minutes at room temperature.

The preprocessed powders were washed with water, and thereafter immersed for two minutes in an Ni-B plating solution including nickel sulfate and sodium borohydride at 90° C., and thus coated diamond powders including a coating of the sintering assistant agent having such compositions and amounts as shown in Table 5 were obtained. During these steps of alkali degreasing, acid cleaning, preprocessing and plating, while the diamond powders were immersed in the solutions, the solutions were agitated by stirring and ultrasonic vibration.

The coated diamond powders were molded into powder compact bodies, and metal plates having such compositions as shown in Table 5 as an additional sintering assistant agent were stacked and sealed into a container of Ta. The Ta container was held at a pressure of 60 kb at a temperature of 1550° C. for 10 minutes by using a girdle type high pressure apparatus, and sintered body samples as shown in Table 6 were obtained.

TABLE 6

| Sintered body sample | Diamond content (vol. %) | Total content of Sn and B if sintering assistant agent (wt. %) | Strength of sintered body (kgf/mm$^2$) |
|---|---|---|---|
| 6A | 85 | 0.005 | 197 |
| 6B | 85 | 1.99 | 234 |
| 6C | 85 | 11.0 | 222 |
| 6D | 85 | 20.9 | 208 |
| 6E | 85 | 33.8 | 135 |

The sintered body samples 6A to 6E shown in Table 6 were obtained from powder samples 5A to 5E of Table 5.

Each of the sintered body samples was processed to a bar-shaped sample piece having dimensions of 6×3×0.3 mm, and the strength thereof was evaluated by a three point bending test with a bending span of 4 mm.

As can be seen from Table 6, it is apparent that samples 6B, 6C and 6D have improved strength compared with samples 6A and 6E. More specifically, it can be understood that when the additional sintering assistant agent includes B, the content thereof should preferably be in the range of 0.01 to 30 percent by weight. Further, it was found that if the additional sintering assistant agent includes P and Sn, the preferable content thereof is from 0.01 to 30 percent by weight.

(Embodiment 4)

For samples 7D to 7F, coated diamond powders having the same composition of the sintering assistant agent as samples 7A to 7C were fabricated by using a microwave plasma CVD method.

For samples 7G to 7I, diamond powders were put together with ultra fine Co powder into a ball mill container formed of Teflon including mixing balls of Teflon, and mixed for three hours. For samples 7J to 7L, the diamond powders were put in a cemented carbide ball mill container including mixing balls formed of cemented carbide, and the cemented carbide ball mill was operated for a prescribed time period, so that diamond powders mixed with cemented carbide powder were obtained. As already described, the cemented

TABLE 7

| Powder sample | Diamond particle size (μm) | Method of applying sintering assistant agent | Content of sintering assistant | Composition of sintering assistant agent (wt. %) |
|---|---|---|---|---|
| 7A | 1–2 | electroless plating | 5.0 | 99.6-Co, 0.1-Pd, 0.3-Sn |
| 7B | 2–8 | electroless plating | 5.0 | 99.6-Co, 0.1-Pd, 0.3-Sn |
| 7C | 5–15 | electroless plating | 5.0 | 99.6-Co, 0.1-Pd, 0.3-Sn |
| 7D | 1–2 | CVD | 5.0 | 99.6-Co, 0.1-Pd, 0.3-Sn |
| 7E | 2–8 | CVD | 5.0 | 99.6-Co, 0.1-Pd, 0.3-Sn |
| 7F | 5–15 | CVD | 5.0 | 99.6-Co, 0.1-Pd, 0.3-Sn |
| 7G | 1–2 | mixing ultra fine powder | 5.0 | 100-Co |
| 7H | 2–8 | mixing ultra fine powder | 5.0 | 100-Co |
| 7I | 5–15 | mixing ultra fine powder | 5.0 | 100-Co |
| 7J | 1–2 | cemented carbide ball mill | 5.0 | 15-Co, 85-WC |
| 7K | 2–8 | cemented carbide ball mill | 5.0 | 15-Co, 85-WC |
| 7L | 5–15 | cemented carbide ball mill | 5.0 | 15-Co, 85-WC |

Table 7 shows various powder samples prepared for studying the influence of the raw material diamond particle size, the method of applying the sintering assistant agent and the composition thereof on the mechanical properties of the sintered bodies.

For samples 7A to 7C, a catalytic layer for electroless plating was applied to the surface of the diamond powder particles in a similar manner as in Embodiment 3 so as to coat the diamond powders with the sintering assistant agent by electroless plating.

The pre-processed diamond powder was washed with water, and thereafter immersed in a Co electroless plating solution containing cobalt chloride and hydrazinium chloride and held at 80° C., and thus a Co coating was provided on the surface of the diamond particles. During preprocessing related to electroless plating and during plating, the solutions together with the diamond powder were agitated by stirring and ultrasonic vibration. The electroless plated diamond powder was washed and collected, thereafter heated in vacuum at 1250° C. for 60 minutes, so that the sintering assistant agent was reduced and the diamond particles were partially graphitized at and progressing from the surface thereof. As a result, powder samples 7A to 7C having such contents and compositions of the sintering assistant agent as shown in Table 7 were obtained. The amount of oxygen contained in the powders of samples 7A to 7C was 0.05 percent by weight.

carbide powder was scraped off from the cemented carbide balls and the container and mixed with the diamond powders.

Each of the powder samples 7A to 7L shown in Table 7 was molded to form a powder compact body, a Co plate was stacked on the powder compact body, and the powder compact body with the plate stacked thereon was sealed in a container of cemented carbide. The cemented carbide container was held at a pressure of 50 kb at a temperature of 1500° C. for 15 minutes by a belt type high pressure apparatus, so that the stacked Co plate was melted and infiltrated into the powder compact body during sintering, and as a result, sintered body samples as shown in Table 8 were obtained.

TABLE 8

| Sintered body sample | Diamond content (vol. %) | Composition of sintering assistant agent after sintering (wt. %) | Flank wear (μm) |
|---|---|---|---|
| 8A | 86.9 | 99.88-Co, 0.03-Pd, 0.09-Sn | 88 |
| 8B | 88.3 | 99.85-Co, 0.04-Pd, 0.11-Sn | 67 |
| 8C | 90.2 | 99.93-Co, 0.02-Pd, 0.05 Sn | blade chipping |
| 8D | 86.7 | 99.88-Co, 0.03-Pd, 0.09-Sn | damaged |
| 8E | 87.9 | 99.85-Co, 0.04-Pd, 0.11-Sn | damaged |
| 8F | 90.3 | 99.93-Co, 0.02-Pd, 0.05-Sn | damaged |

TABLE 8-continued

| Sintered body sample | Diamond content (vol. %) | Composition of sintering assistant agent after sintering (wt. %) | Flank wear (μm) |
|---|---|---|---|
| 8G | sintering not possible | | |
| 8H | 87.1 | 100 Co | damaged |
| 8I | 90.0 | 100 Co | damaged |
| 8J | 79.6 | 57.7-Co, 42.3-WC | 211 |
| 8K | 79.8 | 48.3-Co, 51.7-WC | 153 |
| 8L | 88.3 | 35.5-Co, 64.5-WC | blade chipping |

The sintered body samples 8A to 8L shown in Table 8 were obtained from powder samples 7A to 7L of Table 7.

In sample 8G, since the raw material diamond powder had fine particles as shown in Table 7, the space between particles is narrow or small and mixed Co powder is not uniformly distributed. Therefore, when the Co plate was stacked on the powder compact body of the mixed powder for infiltration, the infiltration proceeded unevenly in the powder compact body. As a result, unsintered portions were generated partially in sample 8G and a complete sintered body could not be obtained.

Samples providing complete sintered bodies were processed to form cutting tools thereof, and the performance thereof was evaluated under the following cutting conditions.

Work piece: round bar of Al-10 wt % Si having four grooves along the axial direction Peripheral surface velocity of the work piece: 500 (m/min)

Bit cutting depth: 1.5 (mm)

Bit feeding speed: 0.2 (mm/rev)

Cutting time: 160 (min)

Table 8 shows the flank wear of the sintered body samples as a result of the cutting test. As can be seen from Table 8, sintered body samples 8D, 8E, 8F, 8H and 8I including pools of the sintering assistant agent were damaged in an initial stage of cutting and continuous cutting was impossible. In sintered body samples 8C and 8L having a large diamond particle size, chipping was observed at the blade of the tool during the cutting test. As for sintered body samples 8J and 8K having a low diamond content, although there was no damage, the flank wear was too large to be practical.

Meanwhile, sintered body samples 8A and 8B in accordance with the present invention had a small diamond particle size, and a uniform sintered body texture without voids or Co pools could be obtained, and hence the sintered bodies had a high strength and were free of chipping or damage. In addition, it becomes apparent that samples 8A and 8B have sufficient wear-resistance as shown in Table 8, since they have sufficiently high diamond content.

(Embodiment 5)

TABLE 9

| Powder sample | Conditions for heat treatment of diamond powder | amount of coating of sintering assistant agent (vol. %) | Conditions for heat treatment of coated diamond powder | Degree of graphitization (vol. %) |
|---|---|---|---|---|
| 9A | 1400° C., 60 min. | 4 | heat treatment not performed | 5.3 |
| 9B | 1450° C., 60 min. | 4 | heat treatment not performed | 52.6 |
| 9C | 1500° C., 60 min. | 4 | heat treatment | 93.8 |
| 9D | heat treatment not performed | 4 | heat treatment not performed | 0 |
| 9E | heat treatment not performed | 4 | 1200° C., 60 min. | 5.2 |
| 9F | heat treatment not performed | 4 | 1350° C., 60 min. | 32.1 |

Table 9 shows various powder samples prepared for studying the influence of the degree of graphitization of the diamond powder on the diamond content in the sintered body.

In samples 9A to 9C, raw material diamond powders having a particle size of 5 to 10 μm were heat treated in vacuum under the conditions shown in Table 9 so as to partially graphitize the powders at and progressing from the surface of the particles. The partially graphitized diamond particles were coated by the sintering assistant agent in a similar manner as in Embodiment 1.

In samples 9D to 9F, raw material diamond powder particles having a particle size of 5 to 10 μm were coated with the sintering assistant agent in a similar manner as in Embodiment 1, and thereafter the coated diamond particles were partially graphitized at and from the surface thereof in a vacuum and under the heat treatment conditions shown in Table 9.

The partially graphitized coated diamond powders were molded to form powder compact bodies, a metal plate of 100 % Co as an additional sintering assistant agent was stacked thereon, and then the powder compact bodies and Co plates were sealed in a container of Mo and sintered under a pressure of 50 kb at a temperature of 1550° C. for 10 minutes. Table 10 shows the diamond contents of the sintered body samples obtained in this manner.

TABLE 10

| Sintered body sample | Diamond content (wt. %) |
|---|---|
| 10A | 94.4 |
| 10B | 95.1 |
| 10C | partial sintering (Gr left) |
| 10D | 92.2 |
| 10E | 94.5 |
| 10F | 94.8 |

The sintered body samples 10A to 10F of Table 10 were obtained from powder samples 9A to 9F of Table 9. As can be seen from Table 10, it is apparent that sintered body samples 10A, 10B, 10E and 10F have higher diamond contents than sample 10D. Meanwhile, sample 10C partially included remaining graphite (Gr), and hence a complete sintered body could not be obtained.

More specifically, the degree of graphitization of the coated diamond powder should preferably be in the range of 0.5 to 50 percent by volume.

(Embodiment 6)

TABLE 11

| Powder sample | Diamond particle size (μm) | Amount of absorption of Pd (wt. %) | Amount of coating of sintering assistant agent (vol. %) | Composition of sintering assistant agent (wt. %) |
|---|---|---|---|---|
| 11A | 5–10 | $5 \times 10^{-5}$ | not precipitated | |
| 11B | 5–10 | $8 \times 10^{-3}$ | 5 | Pd-0.08, Co-99.82, Sn-0.1 |
| 11C | 5–10 | $8 \times 10^{-3}$ | 5 | Pd-2.7, Co-97.2, Sn-0.1 |
| 11D | 5–10 | $8 \times 10^{-3}$ | 5 | Pd-38.7, Co-61.2, Sn-0.1 |
| 11E | 5–10 | $8 \times 10^{-3}$ | 5 | Pd-52.1, Co-47.8, Sn-0.1 |

Table 11 shows various powder samples prepared for studying the influence of the amount of application of Pd, on the catalytic property in electroless plating and the sintering property of the diamond powder at the time of sintering.

For samples 11A to 11E, Pd was applied to the surfaces of diamond particles, in a similar manner as in Embodiment 4, so as to coat the diamond powder particles with sintering assistant agent by electroless plating. Thereafter, the diamond powder particles were electroless-plated with Pd, using an electroless plating solution including palladium tetrachloride. Further, the diamond powder particles were coated with Co using an electroless plating solution containing hydrazine.

As a result, as shown in Table 11, the amount of absorption of Pd on the particles of diamond powder was too small in sample 11A, so that the catalytic action by Pd was insufficient and Co was not successfully precipitated at the surface of the diamond particles.

Each of the powder samples 11B to 11E coated with Co was molded into a powder compact body and sealed in a container formed of cemented carbide. The cemented carbide container was held under a pressure of 50 kb at a temperature of 1500° C. for 15 minutes to perform sintering, by using a belt type high pressure apparatus. Sample 11E containing much Pd did not result in a complete sintered body, as melting of the sintering assistant agent did not occur. Meanwhile, complete sintered bodies could be obtained from samples 11B to 11D.

In other words, the preferable content of Pd in the sintering assistant agent is within the range of 0.01 to 40 percent by weight.

As described above, according to the present invention, a diamond sintered body having both high strength and high wear-resistance can be provided, which can be preferably used for cutting tools, digging tools, drawing dies and wear-resistant parts.

Although the present invention has been described and illustrated in detail, it is to be understood that the same is by way of illustration and example only and is not to be taken as a limitation, the spirit and scope of the present invention being limited only by the terms of the appended claims.

What is claimed is:

1. A method of manufacturing a diamond sintered body having high strength and high wear-resistance, comprising the steps of:

providing a diamond powder of diamond particles having a particle size substantially within a range of 0.1 to 10 μm;

coating said diamond particles with a sintering assistant including Pd and at least one of Fe, Co and Ni to form coated diamond particles, comprising precipitating Pd within a range of 0.01 to 40 percent by weight of a total of said sintering assistant on a surface of each said diamond particle, and thereafter electroless plating at least one of Fe, Co and Ni onto each said diamond particle in an amount to provide a total of said sintering assistant within a range of 4 to 20 percent by volume of said coated diamond particles; and sintering said coated diamond particles in a liquid phase under a high pressure and high temperature condition in which diamond is stable.

2. The method according to claim 1, wherein said sintering assistant further includes at least one of Sn, P and B within a range of 0.01 to 30 percent by weight of the total of said sintering assistant, and wherein said step of coating said diamond particles further comprises applying said at least one of Sn, P and B onto said diamond particles.

3. The method according to claim 2, wherein said sintering assistant includes said at least one of Sn, P and B within a range of 0.01 to 11.5 percent by weight of the total of said sintering assistant.

4. The method according to claim 1, further comprising, prior to said step of coating said diamond particles, an additional step of heat treating said diamond particles at a high temperature at which diamond is unstable so as to graphitize 0.5 to 80 percent by volume of each said diamond particle at and progressing from a surface of each said diamond particle.

5. The method according to claim 1, further comprising, between said step of coating and said step of sintering, an additional step of heat treating said coated diamond particles at a high temperature at which diamond is unstable so as to graphitize 0.5 to 80 percent by volume of each said coated diamond particle at and progressing from a surface of each said diamond particle.

6. The method according to claim 1, wherein said electroless plating includes immersing said diamond particles in a plating solution and agitating said plating solution by at least one of stirring and ultrasonic vibration.

7. A method of manufacturing a diamond sintered body having high strength and high wear-resistance, comprising the steps of:

providing a diamond powder of diamond particles having a particle size substantially in a range of 0.1 to 10 μm;

coating said diamond particles with a first sintering assistant including Pd and at least one of Fe, Co and Ni to form coated diamond particles, comprising precipitating Pd in a range of 0.01 to 40 percent by weight of a total of said first sintering assistant on a surface of each said diamond particle, and thereafter electroless plating at least one of Fe, Co and Ni onto each said diamond particle in an amount to provide a total of said first sintering assistant within a range of 0.1 to 19.9 percent by volume of said coated diamond particles;

molding said coated diamond particles to form a compact body;

bringing an additional sintering assistant including at least one of Pd, Fe, Co and Ni into contact with said compact body; and sintering said compact body in a liquid phase under a high pressure and high temperature condition in which diamond is stable, while infiltrating said additional sintering assistant into said compact body.

8. The method according to claim 7, wherein said first sintering assistant further includes at least one of Sn, P and B within a range of 0.01 to 30 percent by weight of the total of said first sintering assistant, and wherein said step of coating said diamond particles further comprises applying said at least one of Sn, P and B onto said diamond particles.

9. The method according to claim 8, wherein said first sintering assistant includes said at least one of Sn, P and B within a range of 0.01 to 11.5 percent by weight of the total of said first sintering assistant.

10. The method according to claim 9, further comprising, prior to said step of coating said diamond particles, an additional step of heat treating said diamond particles at a high temperature at which diamond is unstable so as to graphitize 0.5 to 80 percent by volume of each said diamond particle at and progressing from a surface of each said diamond particle.

11. The method according to claim 7, further comprising, between said step of coating and said step of sintering, an additional step of heat treating said coated diamond particles at a high temperature at which diamond is unstable so as to graphitize 0.5 to 80 percent by volume of each said coated diamond particle at and progressing from a surface of each said diamond particle.

12. The method according to claim 7, wherein said additional sintering assistant further includes at least one of Sn, P and B within a range of 0.01 to 30 percent by weight of the total of said additional sintering assistant, and wherein said step of coating said diamond particles further comprises applying said at least one of Sn, P and B onto said diamond particles.

13. The method according to claim 12, wherein said additional sintering assistant includes said at least one of Sn, P and B within a range of 0.01 to 11.5 percent by weight of the total of said additional sintering assistant.

14. The method according to claim 7, wherein said electroless plating includes immersing said diamond particles in a plating solution and agitating said plating solution by at least one of stirring and ultrasonic vibration.

15. A diamond sintered body having high strength and high wear-resistance, comprising sintered diamond particles of 80 to 96 percent by volume and a remainder of a sintering assistant agent and unavoidable impurities, wherein said sintered diamond particles have a particle size substantially in a range of 0.1 to 10 μm and are directly bonded to each other, and wherein said sintering assistant agent includes Pd within a range of 0.01 to 40 percent by weight and at least one of Fe, Co and Ni.

16. The diamond sintered body according to claim 15, wherein said sintering assistant agent further includes at least one of Sn, P and B.

17. The diamond sintered body according to claim 16, wherein said sintering assistant agent includes said at least one of Sn, P and B within a range of 0.01 to 30 percent by weight.

* * * * *

UNITED STATES PATENT AND TRADEMARK OFFICE
CERTIFICATE OF CORRECTION

PATENT NO. : 5,759,216
DATED : June 2, 1998
INVENTOR(S) : Kanada et al.

It is certified that error appears in the above-indentified patent and that said Letters Patent is hereby corrected as shown below:

Col. 9, above "TABLE 3" insert --(Embodiment 2)--.

Col. 19, line 7, after "claim" replace "9," by --7,--.

Signed and Sealed this

Eighteenth Day of August, 1998

Attest:

BRUCE LEHMAN

Attesting Officer      Commissioner of Patents and Trademarks